United States Patent [19]
Rodrigues et al.

[11] Patent Number: 6,047,231
[45] Date of Patent: Apr. 4, 2000

[54] FOUR WHEEL DRIVE TRANSFER CASE CONTROLLER COMPATIBLE WITH A SPARE TIRE

[75] Inventors: Ashok Rodrigues, Canton; John Glab, Riverview, both of Mich.

[73] Assignee: Ford Global Technologies, Inc., Dearborn, Mich.

[21] Appl. No.: 08/870,210

[22] Filed: Jun. 6, 1997

[51] Int. Cl.[7] .................................................. G06F 7/00
[52] U.S. Cl. .............................. 701/69; 701/74; 701/79; 701/89; 180/197; 180/233; 180/248
[58] Field of Search ................................ 701/69, 70, 74, 701/78, 79, 89; 180/197, 233, 248

[56] References Cited

U.S. PATENT DOCUMENTS

| | | | |
|---|---|---|---|
| 3,656,573 | 4/1972 | Halberg | 180/44 R |
| 4,467,886 | 8/1984 | DeClaire et al. | 180/197 |
| 4,718,303 | 1/1988 | Fogelberg | 74/710.5 |
| 4,773,517 | 9/1988 | Watanabe | 192/32 |
| 4,884,653 | 12/1989 | Kouno | 180/233 |
| 4,961,476 | 10/1990 | Witte et al. | 180/197 |
| 4,989,686 | 2/1991 | Miller et al. | 180/197 |
| 4,991,678 | 2/1991 | Furuya et al. | 180/197 |
| 5,032,995 | 7/1991 | Matsuda et al. | 701/81 |
| 5,060,747 | 10/1991 | Eto | 180/197 |
| 5,215,160 | 6/1993 | Williams et al. | 180/197 |
| 5,219,038 | 6/1993 | Hamada et al. | 180/248 |
| 5,461,568 | 10/1995 | Morita | 701/81 |
| 5,479,348 | 12/1995 | Sasaki | 70/81 |

FOREIGN PATENT DOCUMENTS

| | | |
|---|---|---|
| 0298397 | 2/1989 | European Pat. Off. . |
| 0393596 | 10/1990 | European Pat. Off. . |

*Primary Examiner*—William A. Cuchlinski, Jr.
*Assistant Examiner*—Yonel Beaulieu
*Attorney, Agent, or Firm*—Ford Global Technologies, Inc.

[57] ABSTRACT

A method of monitoring the relative effective diameters of the tires and compensating therefor in a vehicle which includes a front driveshaft for transferring motive power to a front set of wheels and a rear driveshaft for transferring motive power to a rear set of wheels, each of the wheels having an effective diameter. Front and rear driveshaft values indicative of the rotational speed of each driveshaft are generated. A difference value indicative of a difference between said front and rear driveshaft values is then generated. A low pass filtered value is generated according to the relationship of $Y_{1p}=(1-\beta)*U(k)+\beta*Y_{1p}(k-1)$. The low pass filtered value is monitored for a predetermined period of time to determine if one of the wheels has a smaller effective diameter than the other wheels.

19 Claims, 6 Drawing Sheets

[G] Brake Off & (Zero_Veh_Speed for > 10 Min.)
/Ignition Off/

[H] 4HI/4LOW Mode Selected/
- Set Increment_Clutch_Rate=Normal
- Set Rear_Slip_Table=Normal
- Set Shaft_error_counts=normal

[J] Auto Mode Selected
& Spare_Tire_Qualified/
- Set rear Slip_Table_Values=
  (Normal+Spare_Tire_Slip_Offset)
- Set Increment_Clutch_Rate=Spare_Tire_Clutch_Inc
-Set Shaft_error_counts=Shaft_Error_Sense_Counts

[K] Auto Mode Selected
& Spare_Tire_sensed
& NOT Spare_Tire_Qualified/
- Set rear Slip_Table_Values=
  (Normal+Spare_Tire_Slip_Offset)
- Set Increment_Clutch_Rate=Spare_Tire_Clutch_Inc
-Set Shaft_error_counts=Shaft_Error_Sense_Counts

[L] 4HI/4LOW Mode Selected/
- Set Increment_Clutch_Rate=Normal
- Set Rear_Slip_Table=Normal
- Set Shaft_error_counts=normal

FIGURE 4B

FOUR WHEEL DRIVE TRANSFER CASE CONTROLLER COMPATIBLE WITH A SPARE TIRE

BACKGROUND OF THE INVENTION

1. Field of the Invention

This invention relates to the field of electronic powertrain controllers, and more particularly to the field of four-wheel drive vehicles which utilize an electronic powertrain controller.

2. Discussion of the Prior Art

Four-wheel drive vehicles provide traction often unattainable in two-wheel drive vehicles by delivering power to each of the vehicle's four wheels. Attendant with the added traction provided by four wheel drive is the added complexity of the drive train required to control and deliver power to all four wheels as opposed to only two wheels. For instance, it is desirable to alter the delivery of power to the front wheels and the rear wheels depending upon whether the vehicle is turning, or is being driven on low traction surfaces such as rain or ice covered surfaces to eliminate relative slip between the front and rear tires. During a situation where wheel slippage is detected, torque is transferred to the nonslipping wheels to maximize traction.

To maximize package space and reduce weight, it is desirable to provide a smaller spare tire in a motor vehicle. However, when a smaller spare tire is provided, the spare may have a smaller rolling radius than the other tires. A wheel having the smaller spare tire installed will therefore rotate at a higher angular velocity. Similarly when a tire has low air pressure, that wheel will have a smaller rolling radius and rotate at a higher angular velocity. In a four wheel drive system which provides a differential for a variation between front to rear velocities, the vehicle driveline controller will detect this higher angular velocity and mistake the higher angular velocity for a "false" wheel slippage. The controller will then transfer torque to the other, "nonslipping", wheels to ensure maximum traction to overcome this "false" slippage situation. The torque transfer to the "nonslipping" wheels causes the differential to cycle excessively and may create a situation where the driveline binds up, creating unacceptable drivability issues as well as potential driveline damage. These concerns are particularly evident in full time four wheel drive systems, where the operator of the vehicle cannot select two wheel drive when a spare tire used.

Strategies designed to compensate for this slip must try to satisfy conflicting vehicle requirements, namely, the need to provide torque to a wheel pair and the need to release the limited slip device to prevent bindup. Rapid release of the limited slip device to prevent bindup may lead to an extended cycling condition, which in turn may produce NVH problems and durability concerns in the limited slip device.

The delivery of power between the front wheels and the rear wheels of the vehicle is typically handled by a transfer case mechanism, which includes either a mechanically or electronically controlled clutch. The inventors herein have recognized that known transfer case control systems experience problems particularly when a tire having a smaller rolling radius is used.

Accordingly, there is a need for a control mechanism for a transfer case in a four-wheel drive vehicle which identifies when a tire having a smaller rolling radius is used and provide a compensation for such a difference.

SUMMARY OF THE INVENTION

Accordingly, it is an object of the present invention to identify when a tire having a smaller rolling radius is provided on a four-wheel drive vehicle and to control the four-wheel drive mechanism in a manner which compensates for the difference in rolling radius.

In accordance with the objects of the invention, in a preferred embodiment, a method of monitoring the relative effective diameters of the tires and compensating therefor is provided. A vehicle includes a front driveshaft for transferring motive power to a front set of wheels and a rear driveshaft for transferring motive power to a rear set of wheels, each of the wheels having an effective diameter. Front and rear driveshaft values indicative of the rotational speed of each driveshaft are generated. A difference value indicative of a difference between said front and rear driveshaft values is then generated. A low pass filtered value is generated according to the relationship of $Y_{1p}=(1-\beta)*U(k)+\beta*Y_{1p}(k-1)$. The low pass filtered value is monitored for a predetermined period of time to determine if one of the wheels has a smaller effective diameter than the other wheels.

In a preferred embodiment, the low pass filtered value is limited to a predetermined level and subtracted from the difference value to generate a high pass filtered value. A controller then controls the amount of power delivered to said front driveshaft and to said rear driveshaft, as a function of the high pass filtered value.

An advantage of certain preferred embodiments is that a smaller effective wheel diameter is detected at vehicle startup. Once a smaller effective wheel diameter is detected, the controller compensates for it. Furthermore, the low pass filtered value is limited so the drivetrain may be controlled to provide torque when the wheels are slipping at a low rate of slip buildup such as in sand.

These and other features and advantages of the present invention may be better understood by considering the following detailed description of a preferred embodiment of the invention. In the course of this description, reference will frequently be made to the attached drawings.

BRIEF DESCRIPTION OF THE DRAWINGS

FIGS. 4, 4A, and 4B illustrates a state machine including a preferred embodiment of the present invention.

DETAILED DESCRIPTION OF A PREFERRED EMBODIMENT

Figure 1:
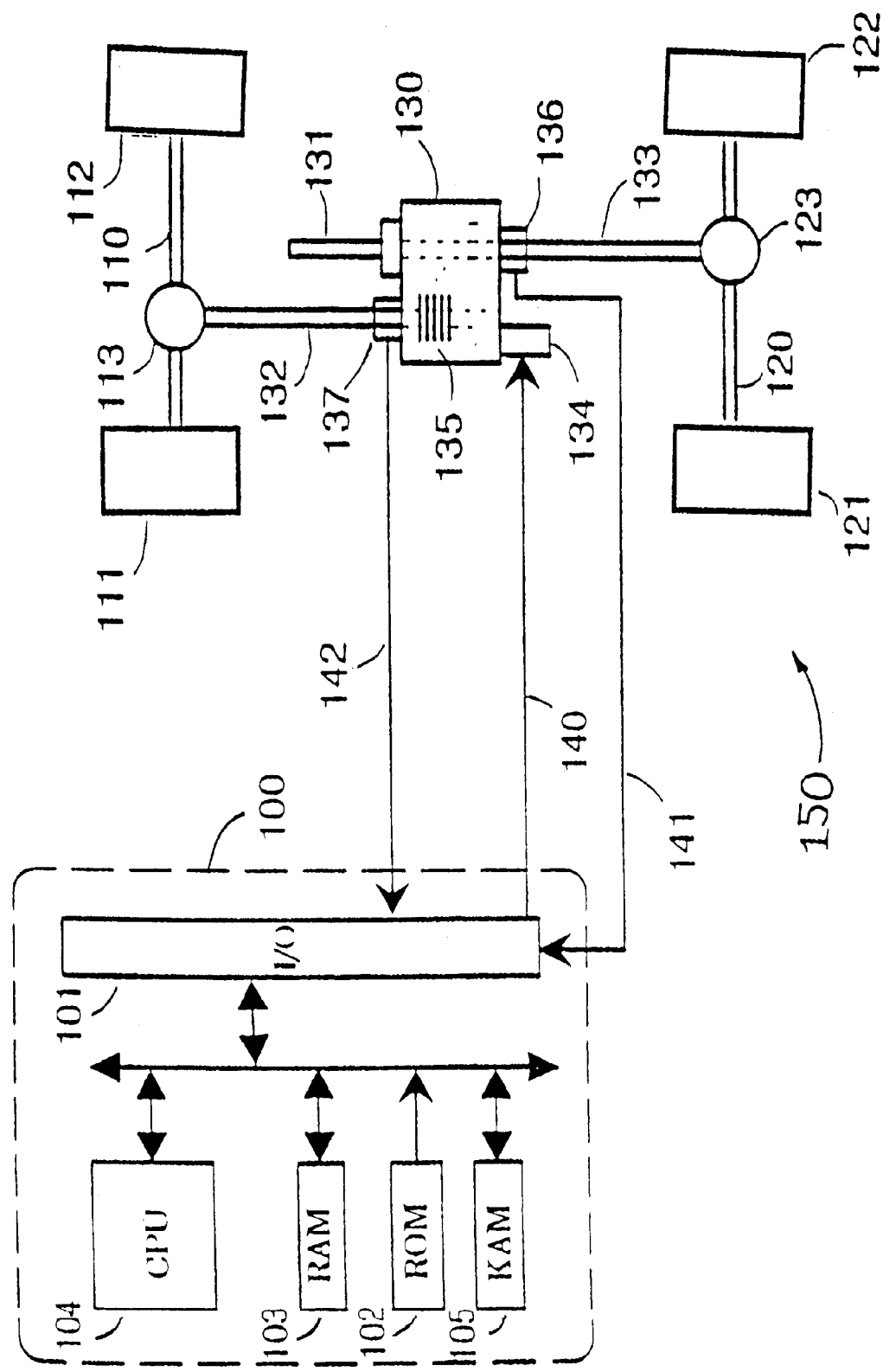
FIG. 1 of the drawings shows a block diagram of a powertrain controller and a four-wheel drive powertrain which embody the principles of the invention.

In FIG. 1 of the drawings, a powertrain controller 100 controls the operation of a transfer case 130 of a four-wheel drive vehicle 150. The powertrain controller 100 preferably includes a central processing unit 104, a read-only memory (ROM) 102 for storing control programs, a random-access memory (RAM) 103 for temporary data storage, a keep-alive-memory (KAM) 105 for storing learned values, a conventional data bus and I/O ports 101 for transmitting and receiving signals to and from the transfer case 130.

The transfer case 130 includes an electronically controlled clutch 135 for transferring motive power from an input shaft 131, which transmits power from an engine transmission (not shown), to a front driveshaft 132 and a rear driveshaft 133, in response to a clutch Pulse Width Modulated (PWM)

signal 140 generated by powertrain controller 100. The transfer case 130 preferably takes a form as described in U.S. Pat. No. 4,718,303, to Mark J. Fogelberg, entitled "Four Wheel Drive Transfer Case With Clutch Mechanism", which is incorporated herein by reference in its entirety. The clutch 135 preferably takes a form as described in U.S. Pat. No. 4,989,686, to Miller et al, entitled "System For Controlling Torque Transmission In A Four Wheel Drive Vehicle" ('686 Patent), or U.S. Pat. No. 5,407,024 to Watson, et al , entitled "On Demand Vehicle Drive System", which are hereby incorporated by reference in their entirety.

As described in the '686 Patent, clutch 135 takes the form of an electromagnetic clutch which operates in accordance with a clutch PWM signal, which controls the amount of slippage between friction plates of the clutch by altering a magnetic field causing movement of an apply plate which engages the friction plates, thereby controlling the amount of power delivered from the input shaft 131 to the front and rear driveshafts. As described by Miller et al in the '686 patent, the clutch, when engaged, either fully or partially, preferably operates to add torque to the slower turning of the two driveshafts (front or rear) and to subtract torque from the faster turning driveshaft.

The front driveshaft 132 provides motive power to a front differential 113, which controls the amount of motive power delivered over a pair of front wheel shafts to a left front wheel 111 and a right front wheel 112. The rear driveshaft 133 provides motive power to a rear differential 123, which controls the amount of motive power delivered over a pair of wheel shafts to a left rear wheel 121 and a right rear wheel 122. A front driveshaft speed sensor 137 detects the rotational speed of the front driveshaft 132 and transmits a front driveshaft speed signal 142 to powertrain controller 100. A rear driveshaft speed sensor 136 detects the rotational speed of the rear driveshaft 133 and transmits a rear driveshaft speed signal 141 to powertrain controller 100. The sensors 137 and 136 are preferably conventional magnetic type sensors, which transmit a pulse in response to rotation of each tooth on a gear or rotor secured to turn with the driveshaft, past the sensor. Thus, the frequency of signals 141 and 142 are proportional to the rotational speed of the respective driveshaft.

A preferred embodiment of the present invention advantageously generates clutch PWM signal 140 in a manner which adjusts the amount of power delivered by front driveshaft 132 and rear driveshaft 133 to compensate for differing effective diameters of wheels 111, 112, 121 and 122. As will be appreciated by those skilled in the art in view of the present disclosure, the wheels of a vehicle may have differing effective diameters, as described in copending U.S. patent application, Ser. No. 08/352,668, filed Dec. 9, 1994 by Gibson et al, which is assigned to the assignee of the present application and which is hereby incorporated by reference ('668 application). The operating strategy in the '668 application filters wheel speed using a high pass filter. The present application provides a low pass filter to detect a spare tire and further provides a limit for the low pass filter. As described below, the low pass filter limit accommodates slippage in some situations, thereby improving traction and preventing damage to the transfer case.

For purposes of this description, "spare tire" is used to generally indicate a tire with a smaller effective diameter, which could result from differing inflation pressures or if the tires exhibit different flexing characteristics, or if a different size wheel or tire is installed ion the vehicle other than a spare tire.

Figure 2:
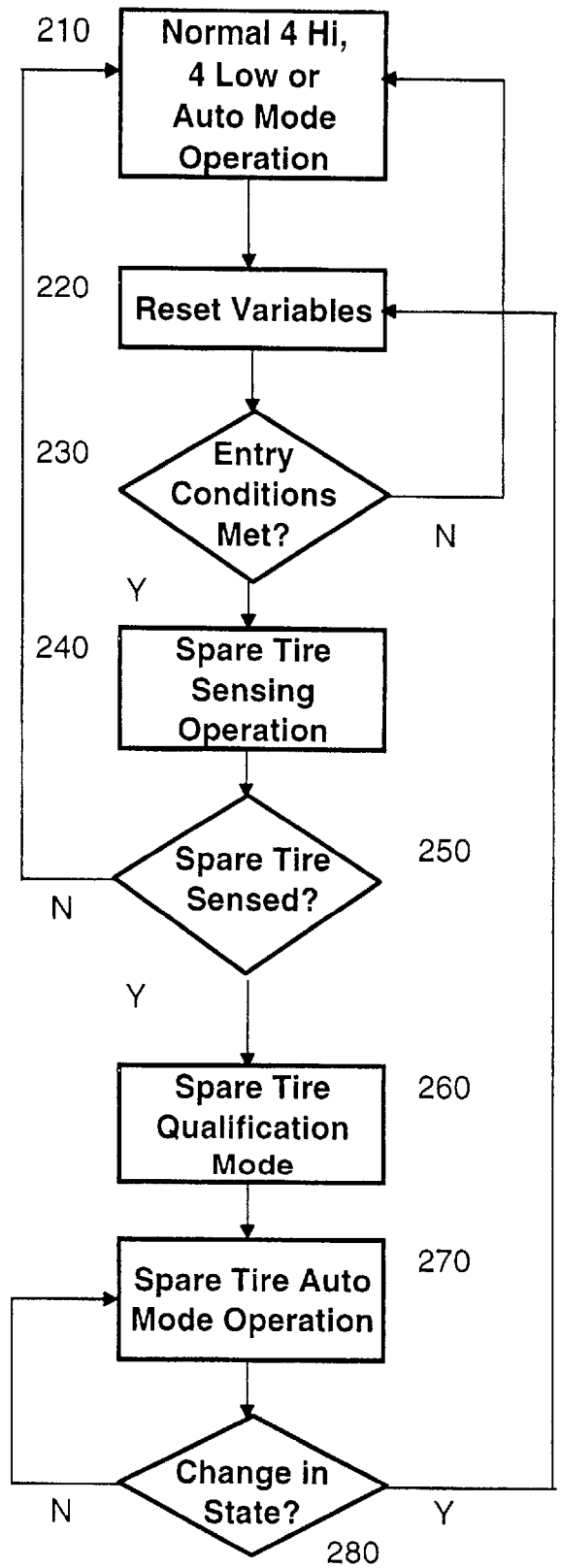
FIG. 2 is a flowchart of the steps executed in a preferred embodiment.

FIG. 2 of the drawings shows the steps of a clutch routine according to the present invention. The clutch routine uses a high-pass filter to filter front-to-rear wheel speed differences below approximately 1 Hz and limits the amount of slip based on a radius variation expected from the vehicle. Because the high pass filter comprises the speed difference minus the low pass filtered value, the high pass filter precludes reaction to rolling radius variations, but permits reaction to true slip events. The routine is executed by powertrain controller 100 as a portion of a stored program to adjust the operation of the limited slip device, including clutch 135, based on a sensed tire having a smaller rolling radius.

As shown in FIG. 2, the vehicle begins operation under a normal 4×2 or 4×4 mode 210, or alternatively in an AWD mode. When appropriate, and in a preferred embodiment only at vehicle startup, the controller 100 resets all variables to default, making no distinction that a spare tire is present 220. The spare tire sensing operation, as described below, is then run once after entry conditions are met. One skilled in the art appreciates that in an alternative embodiment, as described below, the detection may occur alternatively during various stages of operation.

At startup, the controller 100 thus clears the flags Spare__Tire__Sensed, No__Spare__Tire__Sensed, and Spare__Tire__Qualified. All other variables are reset to values indicating no spare tire is on the vehicle (i.e. the vehicle presumes no spare tire until one is sensed each time the vehicle is started). Once entry conditions are met 230, the controller 100 determines if a spare tire is present 240.

The entry conditions include whether the vehicle is operating at a speed above a calibratible speed (Spare__Tire__Speed__Thresh__Kph) and the clutch duty cycle is less than a calibratible duty cycle (Max__Spare__Sense__Duty__Cycle), existing for at least a calibratible time (Spare__Tire__Counts__Delay). Thus, before the vehicle tests whether a spare is present, the vehicle speed is preferably high enough to more accurately determine a difference in rotational speed. The clutch is preferably quiet (not engaging and disengaging) while the vehicle is traveling at such speed for a predetermined time period. Furthermore, the test is preferably run only at startup until the controller 100 determines whether a spare tire is present. To accomplish this, a Start__Up flag is reset to "Y" when the vehicle is started up, and the Start__Up flag is set to "N" when one of the spare tire flags described below is set. In a preferred embodiment, entry conditions also require operation in an A4WD mode, i.e. most or all torque being transferred to one pair of wheels, further providing a quiet clutch.

Once the entry conditions are met, the controller 100 enters a spare tire sensing mode 240 where the controller 100 determines whether a spare tire is present. This determination is made by establishing whether the Lowpass Filtered Delta Speed is greater than a calibratible threshold (Spare__Tire__LP__Thresh__QKPH) for a predetermined time period (Spare__Tire__Counts__Limit). If the Lowpass filtered delta speed does exceed the limit, then a flag (Spare__Tire__Sensed) is set 240.

If an adequate number of sample periods have passed (No__Spare__Tire__Period__Limit) and the Spare__Tire__Sensed flag is not set, then a second flag is set to indicate that no spare tire was detected (No__Spare__Tire__Sensed) 240.

Figure 4:
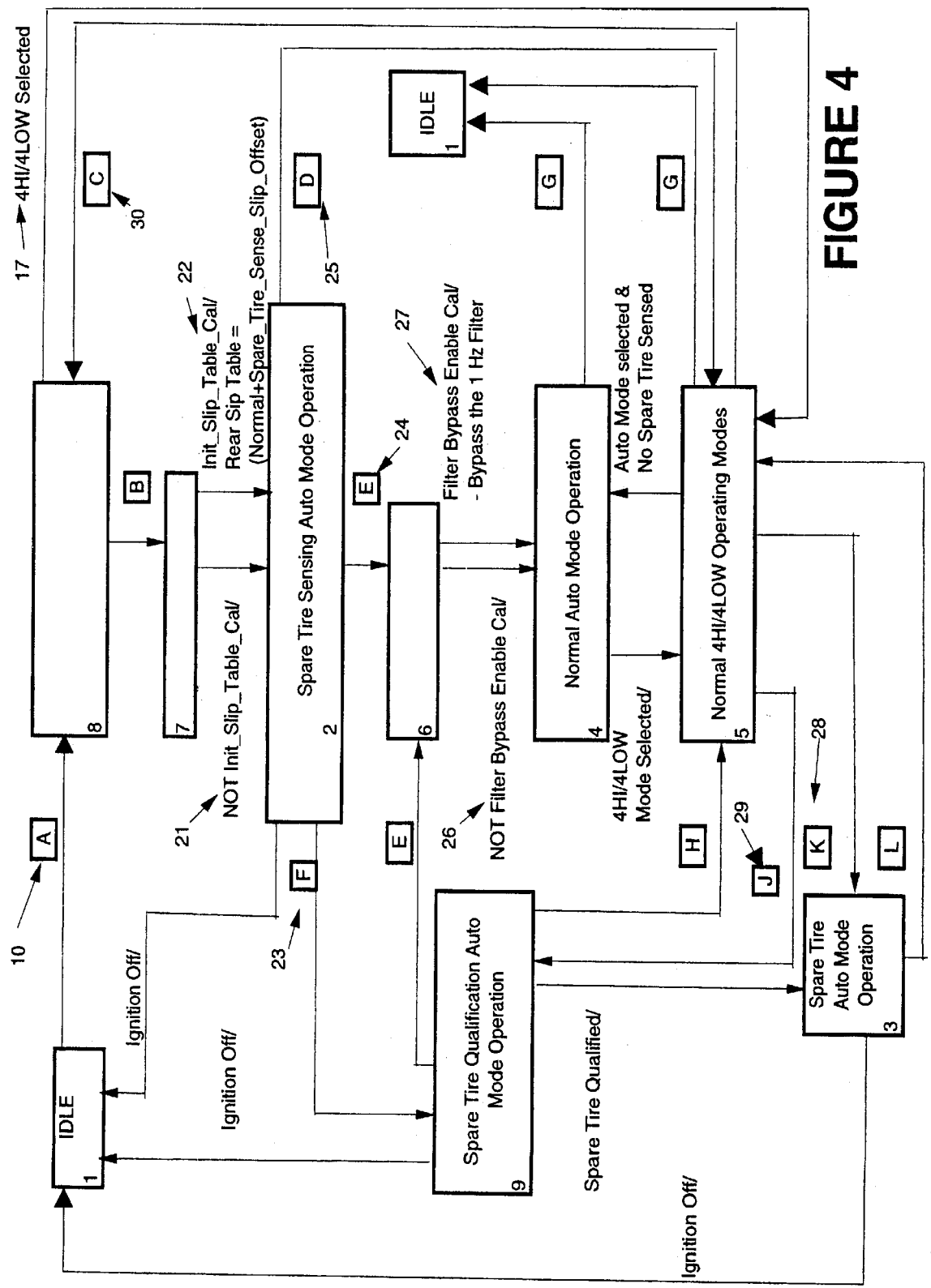

In a preferred embodiment, the variables described above have the following values:

Spare__Tire__Speed__Thresh__Kph=30 KPH
Max__Spare__Sense__Duty__Cycle=10%
Spare__Tire__Counts__Delay=5 seconds
Spare__Tire__LP__Thresh__QKPH=4 QKPH Spare_Tire_Counts_Limit=4.9 seconds
No_Spare_Tire_Periods_Limit=5 Sample Periods Once one of the above flags is set 250 to indicate a spare tire is sensed, the test is preferably repeated to ensure accuracy in a spare tire qualification mode 260. If no spare tire is sensed, then a No_Spare_Tire_Sensed flag is set and the Spare_Tire_Sensed flag is cleared 250 and the vehicle returns to normal operation 210. In an alternative embodiment, the qualification is run if a spare tire is not sensed as well. If the result of the qualification test is consistent, then the Spare_Tire_Qualified flag is set to indicate a spare tire is detected (or low pressure) 260. In preferred embodiment, if the result is inconsistent, the first result is preferably discarded and the test repeated. In a preferred embodiment, the rear slip table values are increased by a predetermined amount Spare_Tire_Slip_Offset (1.5 KPH) prior to the qualification test, as illustrated in FIG. 4 at the left side of the Spare Tire Sensing Auto Mode Operation State 2.

It is known in a motor vehicle to sense or calculate a throttle position and use the input from the throttle position to prepare the transfer case for an anticipated load, conditioning the clutch for application. In a preferred embodiment, any throttle position compensation strategy provided in the controller algorithm for 4 wheel drive operation is overridden during the spare tire sensing and qualification routines, or any such throttle position compensation must be below a calibratible duty. This ensures a quiet clutch during the spare tire routines.

If the No_Spare_Tire_Sensed flag is set, the controller 100 returns to normal operation 210. In a preferred embodiment, when the Spare_Tire_Sensed flag is set, the controller enters a mode 270 which includes a strategy to compensate for the effective radius difference as described below. If, during the spare tire mode 270, a change in state 280 is detected, then the vehicle returns to the normal operation 210. In a preferred embodiment, a change of state 280 includes shutting the vehicle off and restarting the vehicle or the vehicle speed being zero for 10 minutes when the brake is off. In an alternative embodiment, a change of state 280 comprises a flat tire being changed by the driver without shutting of the vehicle or observation of a large difference in speed for an extended period of time. In the alternative embodiment, a change of state is detected when, after a spare tire is detected and a prolonged idle state is detected, the controller 110 runs the tests 240, 250 to determine whether the tire has been changed.

One skilled in the art appreciates that, for the sake of clarity, the flow chart of FIG. 2 does not include all of the exit and entry conditions of the present invention for the Spare Tire Sensing 240, Spare Tire Qualification 260 and Spare Tire Auto 270 modes. One is referred to the state machine illustrated in FIG. 4 for a more comprehensive set of conditions. For example, when in the spare tire sensing operation 240 shown in FIG. 2, corresponding with FIG. 4 spare tire sensing auto mode operation 2, the failure to sense a spare tire 24 or selection of 4 Hi or 4 Lo modes 25 will cause the sensing routine 2 to be exited in a preferred embodiment. Similarly, the spare tire qualification state 9 may be entered from the normal 4 Hi or 4 Lo state 5. These examples are not exhaustive, and one is referred to FIG. 4 for more complete information.

In an alternative embodiment, instead of assuming no spare tire is present at startup, the status of the spare tire detection and qualification is reserved in KAM (step not shown). Thus when the vehicle is restarted, the controller 100 must detect that no spare tire is present, otherwise the flag previously set indicating a spare tire continues to indicate a spare tire and the compensation routine is enabled.

In a preferred embodiment, an indicator (not shown) is provided to display a message to the driver to indicate a spare tire is present or that a tire has lost inflation. The indicator may take the form of a computer display as in known driver information systems, an LED display, or illumination of a light in the cluster. The driver will thereby be made aware of the situation where a tire of differing effective diameter is detected, possibly indicating a tire with low pressure or a spare tire.

In an alternative embodiment, once the above flags are set, the tests 240, 250, are re-run periodically to determine whether a tire has lost pressure. Furthermore, such a test may be run if there is a detection of a difference value in rotational speed exceeding a calibratible level.

The low pass filter used in the present invention comprises a 1 Hz low pass filter ($2\pi/(s+2*\pi)$). The delta speed information passes through the low pass filter, which is limited to a calibratible value (Max_LowPass_Delta_Speed) to provide a low pass delta speed signal. The present invention uses the following equation:

$$Y_{1p}=(1-\beta)*U(k)+\beta*Y_{1p}(k-1)$$

In a preferred embodiment, U(k) corresponds to the difference value of the wheel speeds, $\beta=0.12$, and $Y_{1p}$ is the low pass filtered value. One skilled in the art recognizes the frequency may be varied and the value of $\beta$ may be calculated as described in the '668 application.

Once the low pass delta speed is calculated as described above, it is clamped, or limited, to a value Max_LowPass_Delta_Speed, which in a preferred embodiment is 2 KPH. A high pass delta speed is then calculated by subtracting the low pass delta speed from the measured delta speed as follows:

$$Y_{hp}=U(k)-Y_{1p}$$

Wherein $Y_{hp}$ is the high pass delta speed output. This high pass delta output is utilized by the controller to control the differential clutch.

By thus limiting the low pass delta speed and subtracting the low pass delta speed, the controller is able to control the drivetrain to provide torque when the wheels are slipping at a low rate of slip buildup (such as in sand) but which exceeds the maximum which would be encountered with a spare tire. Otherwise, without such a limit, the filtered high pass signal would be zero and the controller would not transfer torque as desired. However, with the present invention, the controller detects when a slow slip response is present but exceeds the maximum expected for a spare tire and makes a correction therefor. Thus, in the case where a spare tire is present, the delta speed from front to rear will increase slowly as vehicle speed increases to a maximum (based on tire size, etc.). However, as the vehicle encounters a slip situation such as sand, the maximum will be exceeded and thus the filtered value will be greater than zero and the controller will compensate for this situation. This maximum must be determined based on a particular vehicle configuration (2 KPH in the present example) and therefore set the Maximum Lowpass Delta Speed to further compensate for a vehicle's tolerance stackups which contribute to the delta speed.

The spare tire auto mode operation 270 comprises a routine which sets the operating parameters of the system to prevent bindup and excessive cycling when a spare tire is detected. The spare tire mode filters the low frequency differences in speeds and removes the values below one Hz. After these low frequency differences are removed, a system as described in the '668 application is used to compensate for the difference in effective diameters.

Figure 4A:
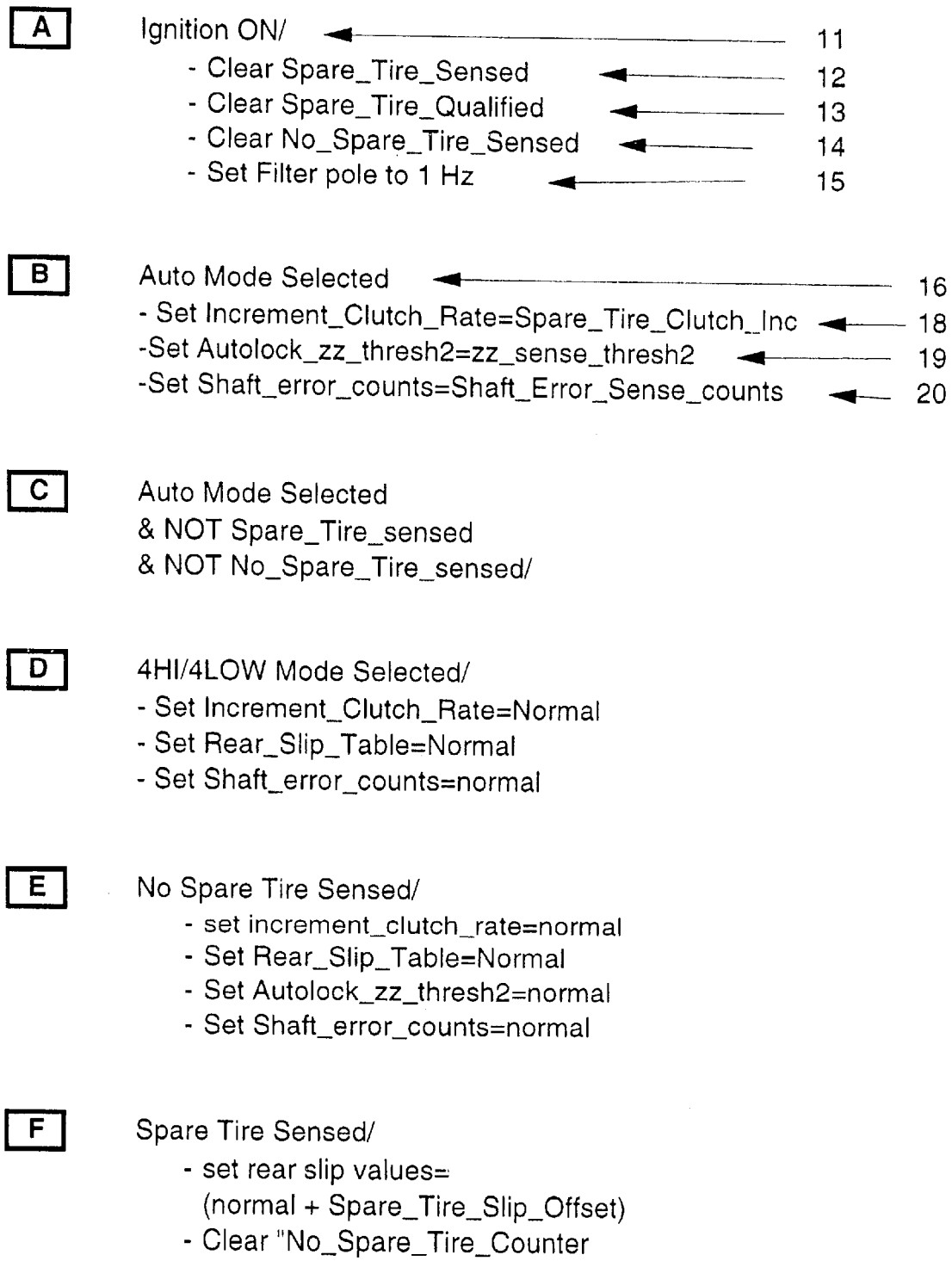

A state machine is provided in FIGS. 4, 4A, and 4B to illustrate in more detail the process to detect a spare tire and operate the transfer case as described above. A state machine is described in some detail here with reference to FIG. 4 for the purpose of understanding a state machine generally. For a more detailed description of State Machines, one is referred to "Switching and Finite Automata Theory", Second Ed., authored by Kohavi, Zvi, published in New York by McGraw Hill, 1978, which is incorporated herein by reference.

Each box 1–9 shown in the state machine of FIG. 4 comprises a state. The controller operates in one of the states awaiting a transition. Several transitions are illustrated in the state machine, a first of which is indicated at 10, shown as box "A". FIGS. 4A and 4B provide detail of each of the boxes denoted as "A"–"L" which are illustrated in FIG. 4. A transition 10 comprises an event 11, which upon occurrence, triggers one or more actions 12–15. So, for example, when in at idle in the first state 1, upon the first transition 10 where the first event 11 occurs, wherein the ignition is turned on, several actions 12–15 are commanded to clear spare tire flags and set the filter pole to 1 Hz. Whereupon a second state 6 is entered until another transition occurs where an action of selecting a mode occurs, such as at the Auto Mode selection transition 16 or the 4 Hi or 4 Low Mode Selection transition 17.

Upon the occurrence of the auto mode transition 16, actions 18–20 occur to set several variables and a third state 7 is entered. One of two transitions 21, 22 occur to establish the Slip_Table and the spare tire sensing state 2 is entered. If the transition 23 occurs wherein a spare tire is sensed, then the spare tire is qualified at state 9. If the transition 24 occurs wherein no spare tire is sensed, the normal auto mode state 4 is entered after an intermediate state 6 and a further transition 26 or 27 to determine whether to bypass the 1 Hz filter. If either 4 Hi or 4 Low mode is selected at state 25, then the vehicle enters the normal 4 Hi/4 Lo state 5. State 5 is exited if a transition occurs to enter the Auto mode 28–30, or the ignition is turned off or vehicle speed is zero for an extended period 31.

If the spare tire is qualified at state 9, after a transition 23 or 29, then the spare tire auto mode operation is entered at state 3. If no spare tire is sensed or if the vehicle is turned off or if 4 Hi or 4 Low is selected, then the appropriate state is entered.

The Spare tire Auto Mode state 3 is exited if the ignition is turned off or 4 Hi or 4 Low is selected, wherein the appropriate state is entered. Further steps in the state machine are apparent to one skilled in the art by following the directional arrows through the various transitions and states.

In a preferred embodiment, upon sensing a spare tire, the clutch operating parameters are modified as illustrated in the Spare Tire Auto Mode Operation State 3, which are summarized as follows:

Rear_Slip_Table_Values=Normal+1.5 KPH

Clutch_Increment_Rate=4 inc

ZZ_Thresh2_Limit=0.42

Thus, in a preferred embodiment as illustrated above, the values for the rear slip are increased by 1.5 KPH, the clutch increment rate is increased and the threshold at which the autolock is commanded is lowered from approximately 60% to approximately 42% of clutch duty cycle. Furthermore, in the state 7 before the routing to sense a spare tire is run, the initial values of the rear slip table are increased by a Spare_Tire_Sense_Slip_Offset of 0.5 KPH.

As described in the '668 application, the shaft speeds are measured and the delta speed is calculated. The delta speed is filtered as described above to provide the high pass delta output to remove low frequency components.

As will be appreciated by those skilled in the art in view of the present disclosure, removal of low frequency components from the difference value results in a value which is indicative of high frequency differences between the rotational speed of the front driveshaft and the rotational speed of the rear driveshaft. By removing the low frequency component, differences due to effective diameter differences will be removed, while during transient conditions, such as cornering, the high frequency components remain and will be accommodated by the controller.

A clutch PWM signal 140 is generated as a function of the filtered value as described below. Clutch PWM signal 140 is a fixed frequency signal with a duty cycle which is altered to have a minimal duty cycle when the filtered difference in rotational speeds between the front and rear driveshafts is below a calibratible slip allowance. Such a calibratible allowance is described in the '024 patent in columns 19–20 with reference to Table II. When the filtered value indicates a difference in rotational speed between the front and rear driveshafts exceeding a calibratible slip allowance, the duty cycle of clutch PWM signal 140 increases at a fixed interval to a maximum duty cycle, or until the filtered value indicates no high frequency differences between the rotational speeds of the front and rear driveshafts. Clutch PWM signal 140 preferably takes the form of a series of pulses, which has a fixed frequency, and a duty cycle, which varies to control the amount of slippage in clutch 135.

As described in the '668 application, a clutch PWM signal 140 is generated as a function of the filtered value. Clutch PWM signal 140 is a fixed frequency signal with a duty cycle which is altered to have a duty cycle of zero when the rotational speeds of the front and rear driveshafts are equal. When the filtered value indicates a difference in rotational speed between the front and rear driveshafts, the duty cycle of clutch PWM signal 140 increases at a fixed interval to 100%, or until the filtered value indicates no high frequency differences between the rotational speeds of the front and rear driveshafts. Clutch PWM signal 140 preferably takes the form of a series of pulses, which has a fixed frequency, and a duty cycle which varies to determine the amount of slippage in clutch 135.

In an alternative embodiment, as described in copending application Ser. No. 08/756,359, filed Nov. 36, 1996, assigned to the assignee of the present invention, and which is incorporated herein by reference, the vehicle speed is used to determine the apply and decrement rate of the limited slip device. In this embodiment, below a vehicle speed of 16 KPH the decrement rate is 10%, while above 16 KPH the decrement rate is 2%. Thus, as the vehicle is turning on dry pavement, the torque transfer is decremented at a rate to prevent bindup. However, at higher speeds the limited slip device may be decremented more slowly.

In a further alternative embodiment, wheel sensors (not shown) are provided to measure wheel speed instead of the driveshaft sensors described above. In such an embodiment, the rotational speeds of the front and rear wheels are then used in a manner similar to that described above for the driveshaft speeds to determine a differential wheel speed and thus a spare tire under the entry conditions described below. Once the spare tire is detected, the operation of the transfer case may be modified as is further described herein.

Figure 3:
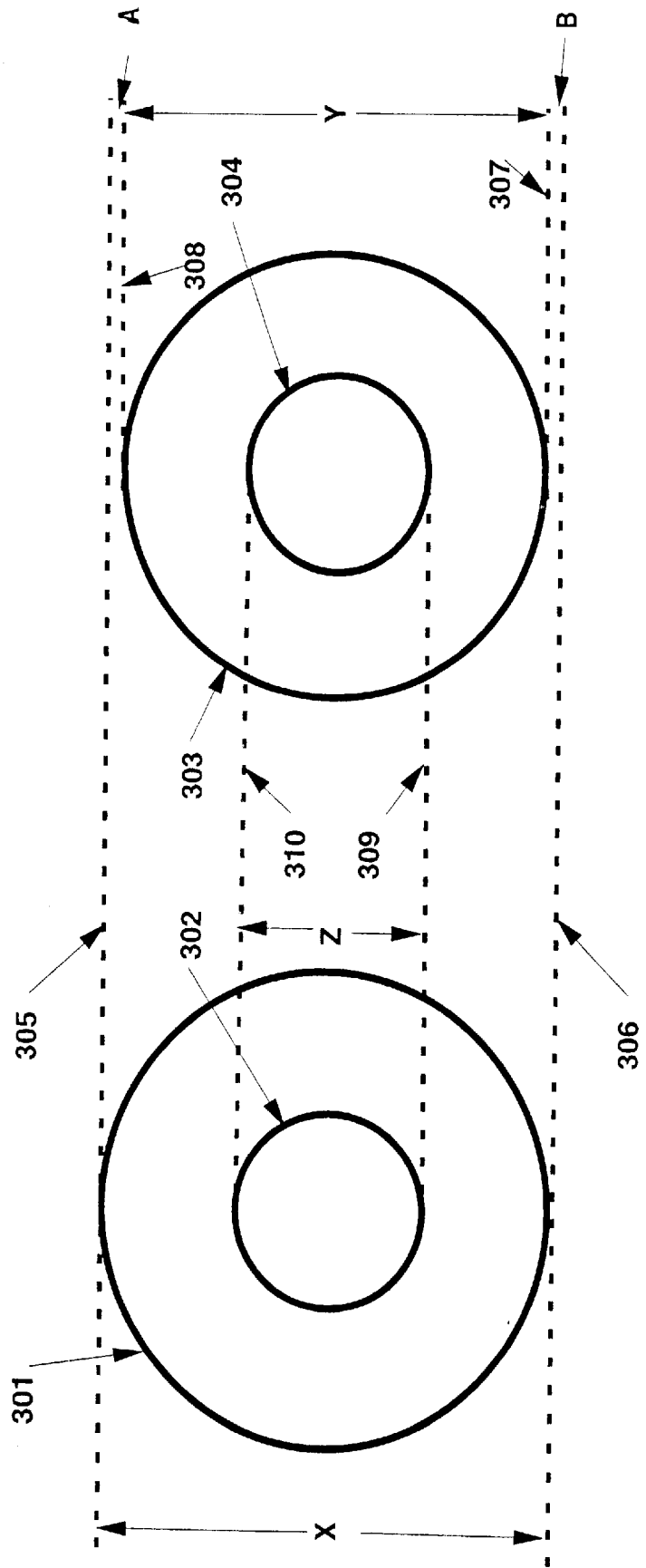
FIG. 3 is a diagram illustrating differing effective wheel diameters.

FIG. 3 shows a wheel 302 and tire 301 combination which has an effective wheel diameter X as delineated by lines 305 and 306. FIG. 3 also shows a wheel 304 and tire 303 combination which has an effective wheel diameter Y as delineated by lines 307 and 308. In FIG. 3, wheels 304 and 302 each have a radius of Z as delineated by lines 309 and 310. The effective wheel diameter of the two wheel and tire combinations however differs due to the diameters of the two tires, 301 and 303. As mentioned above, such a situation may occur if tires 301 and 303 are inflated to different air pressures or if the tires exhibit different flexing characteristics thus causing a different diameter even though the air pressure may be the same as in other tires. The wheel and tire combinations may also have differing effective wheel diameters if the wheels 302 and 304 are of different diameters. Such a situation may occur most commonly if mini-spare tire is used. Other mini-spare tires may present a situation as shown in FIG. 3 where the wheel diameter is the same as other wheels but the tire diameter is smaller than that of other tires. As used herein. the term effective wheel diameter is understood to be the outside diameter of a wheel and tire combination as shown at X or Y in FIG. 3.

It is to be understood that the specific mechanisms and techniques which have been described are merely illustrative of one application of the principles of the invention. Numerous modifications may be made to the methods and apparatus described without departing from the true spirit and scope of the invention.

We claim:

1. In a vehicle which includes a front driveshaft for transferring motive power to a front set of wheels and a rear driveshaft for transferring motive power to a rear set of wheels, each of said wheels having an effective diameter, a method of monitoring the relative effective diameters of the tires, comprising the steps of:

generating a front driveshaft value indicative of the rotational speed of said front driveshaft;

generating a rear driveshaft value indicative of the rotational speed of said rear driveshaft;

generating a difference value indicative of a difference between said front driveshaft value and said rear driveshaft value;

generating a low pass filtered value according to the following relationship:

$$Y_{1p}=(1-\beta)*U(k)+\beta*Y_{1p}(k-1)$$

wherein $Y_{1p}$ is the low pass filtered value; $\beta=e^{-a*T}$; $a=2\pi fc$; $fc$=is a predetermined corner frequency of the filter; T=an amount of time elapsed between a prior execution of said method and the present execution of said method; U(k) corresponds to the difference value of the wheel speeds; and y(k) corresponds to the filtered value; and monitoring the low pass filtered value for a predetermined period of time to determine if one of the wheels has a smaller effective diameter than the other wheels.

2. A method according to claim 1, wherein the vehicle includes a differential having a clutch for distributing motive power to said driveshafts and said low pass filtered value is monitored when the vehicle speed exceeds a predetermined threshold and when said clutch is not cycled more than a predetermined amount.

3. A method according to claim 2, wherein the low pass filtered value is monitored a second time after it has been determined that one of the wheels has a smaller effective diameter to verify one of the wheels has a smaller effective diameter than the other wheels.

4. A method according to claim 3, wherein the corner frequency is approximately 1 Hz.

5. A method according to claim 4 further comprising the step of indicating that one of the wheels has a smaller effective diameter than the other wheels after it has been determined that one of the wheels has a smaller effective diameter.

6. A method according to claim 1, further comprising the steps of:

calculating a Filtered High Pass Delta Speed (FHPDS) using the relationship: FHPDS=U(k)–$Y_{1p}$; and controlling the amount of power delivered to said front driveshaft and to said rear driveshaft, as a function of said FHPDS.

7. A method according to claim 6, further comprising the step of limiting $Y_{1p}$ to a predetermined maximum value corresponding to 1 Hz.

8. A method according to claim 7, further comprising the step of modifying the clutch decrement rate based on vehicle speed.

9. A method according to claim 7, wherein a lookup table is provided to determine rear slip values and said table is incremented a predetermined amount when it has been determined that one of the wheels has a smaller effective diameter than the other wheels.

10. A method according to claim 9, wherein the clutch is incremented at a predetermined rate, and said clutch increment rate is incremented a predetermined amount when it has been determined that one of the wheels has a smaller effective diameter than the other wheels.

11. A method according to claim 10, wherein the low pass filtered value is monitored a second time after it has been determined that one of the wheels has a smaller effective diameter to verify one of the wheels has a smaller effective diameter than the other wheels prior to incrementing the table and clutch increment rate.

12. In a vehicle which includes a front driveshaft for transferring motive power to a front set of wheels and a rear driveshaft for transferring motive power to a rear set of wheels, each of said wheels having an effective diameter, a method of monitoring the relative effective diameters of the tires, comprising the steps of:

generating a front driveshaft value indicative of the rotational speed of said front driveshaft;

generating a rear driveshaft value indicative of the rotational speed of said rear driveshaft;

generating a difference value indicative of a difference between said front driveshaft value and said rear driveshaft value;

generating a low pass filtered value according to the following relationship:

$$Y_{1p}=(1-\beta)*U(k)+\beta*Y_{1p}(k-1)$$

wherein $Y_{1p}$ is the low pass filtered value; $\beta=e^{-a*T}$; $a=2\pi*fc$; $fc$=is a predetermined corner frequency of the filter; T=an amount of time elapsed between a prior execution of said method and the present execution of said method; U(k) corresponds to the difference value of the wheel speeds; and y(k) corresponds to the filtered value;

calculating a Filtered High Pass Delta Speed (FHPDS) using the relationship: FHPDS=U(k)–$Y_{1p}$; and controlling the amount of power delivered to said front driveshaft and to said rear driveshaft, as a function of said FHPDS.

13. A method according to claim 12, further comprising the step of limiting $Y_{1p}$ to a predetermined maximum value corresponding to 1 Hz.

14. A method according to claim 13, further comprising the step of monitoring the low pass filtered value for a predetermined period of time to determine if it has been determined that one of the wheels has a smaller effective diameter than the other wheels.

15. A method according to claim 14, further comprising the step of modifying the clutch increment rate based on vehicle speed.

16. A method according to claim 14, wherein a lookup table is provided to determine rear slip values and said table is incremented a predetermined amount when it has been determined that one of the wheels has a smaller effective diameter than the other wheels.

17. In a vehicle which includes a front driveshaft for transferring motive power to a front set of wheels and a rear driveshaft for transferring motive power to a rear set of wheels, each of said wheels having an effective diameter, a method of monitoring the relative effective diameters of the tires, comprising the steps of:

generating a front driveshaft value indicative of the rotational speed of said front driveshaft;

generating a rear driveshaft value indicative of the rotational speed of said rear driveshaft;

generating a difference value indicative of a difference between said front driveshaft value and said rear driveshaft value;

generating a low pass filtered value $Y_{1p}$;

limiting $Y_{1p}$ to a predetermined maximum value corresponding to 1 Hz;

calculating a Filtered High Pass Delta Speed (FHPDS) using the relationship: FHPDS=$U(k)-Y_{1p}$, wherein $U(k)$ corresponds to the difference value of the wheel speeds; and controlling the amount of power delivered to said front driveshaft and to said rear driveshaft, as a function of said FHPDS.

18. A method according to claim 17, further comprising the step of monitoring the low pass filtered value for a predetermined period of time to determine if it has been determined that one of the wheels has a smaller effective diameter than the other wheels.

19. A method according to claim 18, wherein a lookup table is provided to determine rear slip values and said table is incremented a predetermined amount when it has been determined that one of the wheels has a smaller effective diameter than the other wheels.

* * * * *